Dec. 19, 1950 J. U. LEHN 2,534,358
CHOKER TRAP
Filed Nov. 22, 1946 2 Sheets-Sheet 2
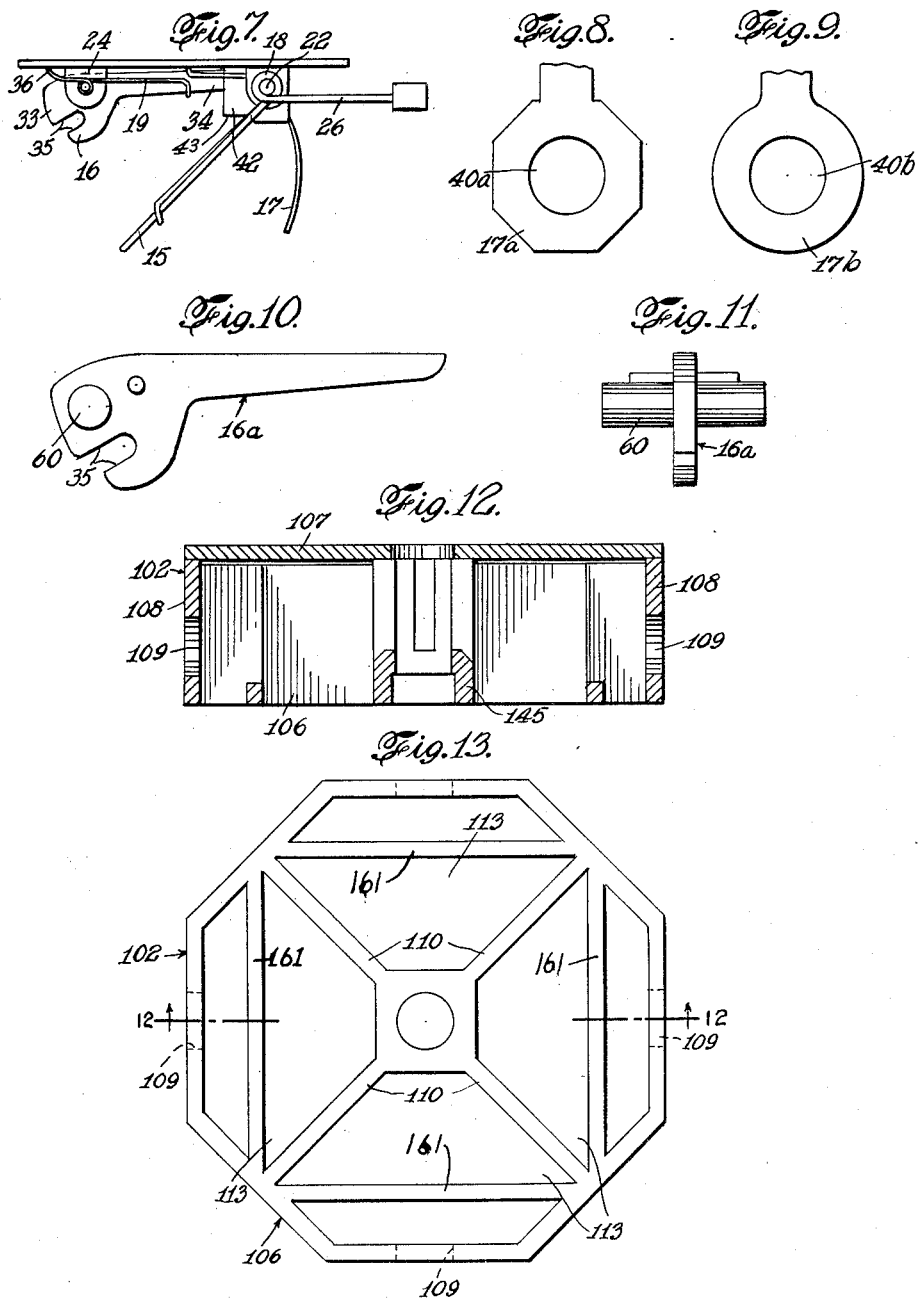
INVENTOR.
JOHN U. LEHN
BY
Robert E Burns
ATTORNEY.

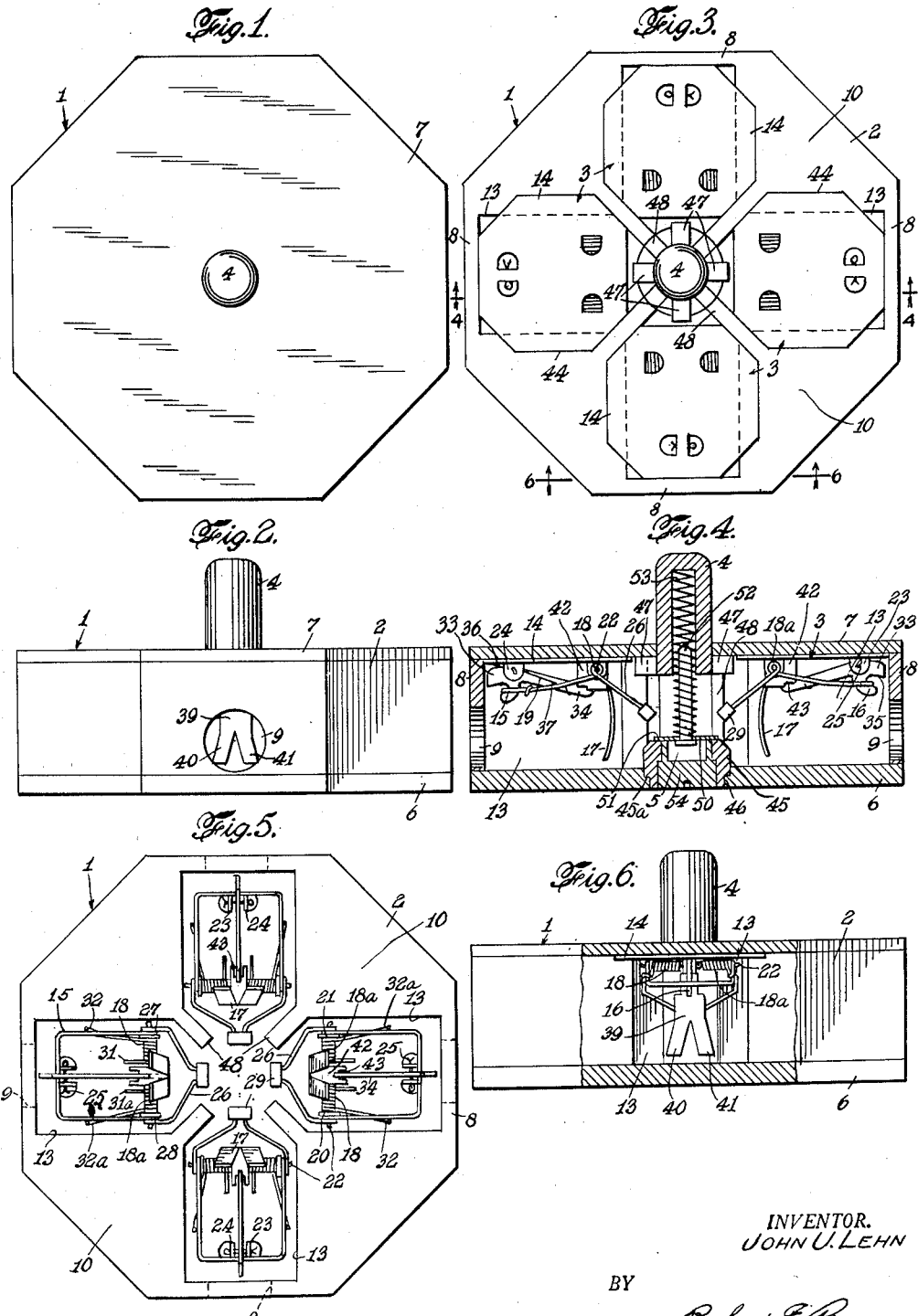

Patented Dec. 19, 1950

2,534,358

UNITED STATES PATENT OFFICE 2,534,358

CHOKER TRAP

John U. Lehn, Lititz, Pa., assignor to Animal Trap Company of America, Lititz, Pa., a corporation of Pennsylvania Application November 22, 1946, Serial No. 711,591

8 Claims. (Cl. 43—85)

The present invention relates to an improved trap for rodents such as mice, rats and other small animals.

The traps heretofore made, have, in many cases, been subject to certain disadvantages among which is the difficulty in setting the trap. The trap is often used by housewives who are generally unfamiliar with mechanical devices and thus have considerable difficulty in manipulating the setting mechanism without pinching their fingers. While automatically latching traps have been made, a certain mechanical dexterity is necessary in setting the trap, especially if it has been upturned and the self adjusting parts have fallen out of position. In some cases, to such people the array of springs and levers is so disconcerting as to result in the non-use of the trap. Further, if such a trap is used and an animal is caught therein the housewife dislikes to remove the dead animal from the trap. Other disadvantages are that the mechanism of such traps is unsightly and is a collector of dust which is removed with difficulty, and that moisture easily reaches the metallic parts causing corrosion which often interferes with the proper operation of the mechanism.

It is an object of the present invention to provide a trap which is completely safe and easy to operate. Another object of the invention is to provide a trap of economical construction in which all of the parts thereof are protected against dust, moisture and the like.

In accordance with the invention, a trap is provided which is automatically set merely by actuating a setting device on the outside of a housing for the trap. The gripping device is completely enclosed in the housing which also acts as the main frame of the trap. Openings are provided in the housing for the entry of the head and a portion of the body of the animal to be trapped. The trap may be set, for example, by pressing a push button on the exterior of the housing. A trapped animal may be released from the trap by pressing the setting button and shaking the animal free of the trap which is then automatically reset. The trap may take a multiple form with a plurality of openings spaced around the wall of the housing. In such an embodiment, means are provided for baiting all units of the trap from a central point which is easily accessible by removing a cover from a bait recess in which the bait is inserted without attaching it to mechanism of any sort.

Other objects and advantages will become apparent from the following description of a trap embodying the invention together with the accompanying drawings, in which:

Fig. 1 is a top view of a trap embodying the invention.

Fig. 2 is a side elevational view of the trap showing an opening in the side thereof for the entry of an animal.

Fig. 3 is a top view corresponding to Fig. 1 with the housing cover removed.

Fig. 4 is a sectional view taken along the line 4—4 of Fig. 3.

Fig. 5 is a bottom plan view of the trap showing the mechanism in the set position and with the bottom removed.

Fig. 6 is a view partly in section taken along the line 6—6 of Fig. 3 showing the releasing trigger of the trap.

Fig. 7 is an enlarged side view of the unit mechanism.

Figs. 8 and 9 are front views showing modifications of the releasing trigger.

Fig. 10 is a side view of a modified form of latch.

Fig. 11 is an end view of the latch shown in Fig. 10.

Fig. 12 is a sectional view taken along the line 12—12 of Fig. 13 showing a modified form of the housing.

Fig. 13 is a bottom plan view of the modified form of the housing shown in section in Fig. 12.

Referring to the drawing, there is shown a multiple trap 1 in accordance with the invention comprising a housing 2, gripping mechanism 3, a setting button 4, and a bait receptacle 5.

The housing 2 forms the supporting and enclosing frame for the trap and may be made of any suitable material such as wood, plastic or metal. The housing as shown is made with a flat bottom 6 of octagon shape, a cover 7 of the same shape and side walls 8. The diameter of the bottom is large compared with the height of the trap producing a construction stable in the upright position. Openings 9 for the entry of animals to be trapped are provided in four of the diametrically opposite side walls. The openings are positioned slightly below the center of the side wall and are of a diameter depending upon the size of the animal for which the trap is to be used. The side walls, cover, and bottom of the trap are supported in a framework by means of triangularly shaped blocks 10 which are positioned behind the alternate diametrically opposite side walls. The spaces between the blocks 10 form four rectangularly shaped chambers 13, entry to the chambers being by the openings 9.

A gripping mechanism 3 is furnished for each of the chambers 13. The mechanism is comprised of a base plate 14, a gripping jaw 15, latching means 16, releasing trigger 17, actuating springs 18 and 18a, and a latch returning spring 19. The base plate 14 is made of a thin rectangularly shaped piece of metal. Adjacent one end thereof the base plate is punched to provide downwardly extending lugs 20 and 21 which are punched to provide a mounting for pivot bar 22 on which is mounted main actuating springs 18 and 18a, releasing trigger 17 and gripping jaw 15. The other end of the base plate 14 is perforated to provide downwardly extending projections 23 and 24 which are likewise punched to provide a mounting for pivot bar 25. Mounted on pivot bar 25 is latch 16 and latch returning spring 19. Gripping jaw 15 is provided with an extension 26 adapted to be actuated by the setting button 4. The gripping jaw and extension 26 may be formed of one continuous piece of wire which may be looped at 27 and 28 for pivotal mounting on pivot bar 22. The ends of the wire are held together by a clamping member 29 having two holes therein approximately the same size as the wire. The wire is inserted in the holes, the block then being pinched to grip the ends of the wire. Actuating springs 18 and 18a have ends 31 and 31a pressing against base plate 14, the other ends 32 and 32a being bent around the gripping jaw 15. The springs tend to urge the gripping jaw downwardly so that the animal which is trapped is gripped between the inside of flat bottom 6 of the trap and gripping jaw 15. Latch 16 is made with a short arm 33 and a comparatively longer arm 34, the short arm 33 being provided with a notch 35 adapted to engage the gripping jaw 15 when the jaw is in the set position. The latch returning spring 19 has one end 36 engaging base plate 14 while the opposite end 37 engages the long end 34 of the latch 16, tending to urge the long end of the latch arm upwardly against the bottom of base plate 14. Releasing trigger 17 has a downwardly depending actuating arm 39 which is split adjacent the end thereof into two portions 40 and 41 to provide a somewhat wider trigger arm for engagement with the body of the animal. The releasing trigger may take other forms as shown in Figs. 8 and 9 at 17a and 17b. In these forms the trigger portions have been substituted by the treadle having the center spaces 40a and 40b punched to provide openings for the animal to try to enter. The releasing trigger 17 is pivoted on the pivot 22 and is provided at its upper end with a short trigger arm 42 (Figures 4, 5 and 7) having a depression 43 to engage the long arm 34 of the latch 16. The gripping mechanism 3 is made as a unit and is positioned in the trap with the mechanism facing downwardly supported at the edges by recessed portions 44 of triangularly shaped blocks 10.

The setting button 4 and bait receptacle 5 are supported in a cylindrical member 45 having a shoulder 45a seated against the flat bottom 6, access to the bait chamber being provided through an opening 46 in the flat bottom. The cylindrical member has four upwardly projecting guide arms 47 adapted slidably to engage projecting ears 48 of the button 4. A flat spring retainer 50 is adapted to be positioned within the cylindrical member 46. The spring retainer 50 has projecting ears 51 of a size to fit between upwardly projecting guide arms 47 (Figs. 3 and 4). In the center of the spring retainer is an upwardly extending spring guide 52 over which is placed a coiled spring 53 adapted to return setting button 4 to the upward position, the guide arms 47 guiding the travel of the button as it is depressed and released. A bait cap 54 is adapted to be received in the bottom of cylindrical member 46. The bait cap has a chamber portion 55 adapted to receive the bait. The spring retainer fits loosely within the cylindrical member and thus the odor of the bait easily travels around the retainer and between upwardly projecting guide arms 47 to the main trap chamber 13. Moreover, if desired, an excess amount of bait may be placed in bait cap 54 raising the spring retainer 50 thus placing the bait closer to chamber 13.

In operating the trap, bait is placed within bait cap 54 which is frictionally held in position within cylindrical member 46. The trap is then set by pushing or stepping on setting button 4 causing projecting button ears 48 to contact setting extensions 26 of gripping jaws 15 forcing the jaws upwardly into notches 35 of the latch arms 16. The upward movement of the gripping jaws in the notches moves the short latch arms 33 and thus also moves the long latch arms 34 which become latched under the bottom sides of short trigger arms 42 thereby holding the gripping jaws in position. It should be noted that by pushing the setting button all traps are simultaneously set. The animal attempting to get at the bait in the bait cap 54 trips the trap when its head or body contacts end 40 or 41 of the trigger arm, releasing latch 16 which in turn releases gripping jaw 15 holding the animal against the inside of flat bottom 6. In order to release the animal, setting button 4 is depressed moving gripping jaw 15 upwardly where it is latched in the set position releasing the animal which may be then easily shaken loose from the trap.

Fig. 10 shows another form of the latch 16a which may be used in the gripping mechanism 3 in which the latch has been furnished with a weight 60 frictionally retained in a hole 61 punched in the latch arm 33. The weight 60 causes the latch to automatically fall into the proper position for engaging the gripping jaw 15 and eliminates the need for latch returning spring 19.

In Figs. 12 and 13 another embodiment of the invention is illustrated in which corresponding parts are designated by the same reference numerals as in Figs. 1–6 with the addition of 100. In Figs. 12 and 13 there is shown a housing 102 which is molded from plastic or similar material. The base 106 and sidewalls 108 are molded in one piece and the cover 107 is molded as a separate piece. Any conventional means such as tongue and notch means may be used to attach the cover portion to the base. The cylindrical member 145 is molded for supporting the setting button 4 and for the bait chamber 54 with the base 106 as are the partitions 110 which are adapted to divide the base into compartments 113 and to support the gripping mechanism. This construction is advantageous in that it permits the forming of the housing in a modernized stream line design. In order to save material the base 106 may be molded with the bottom open. Bars 161 are provided in the base 106 to form a gripping surface for the gripping jaw 15. This construction is advantageous in that it is somewhat easier to remove the trapped animals, and further, in that it makes it easier to adjust the mechanism if necessary.

Thus it will be seen that a trap has been provided which is completely safe to operate even by persons wholly unfamiliar with mechanical devices and in which a novel construction is utilized which may be made at a low cost. All mechanical parts of the trap are enclosed, protecting them against dust and moisture and rendering the trap safer and of neater appearance. While the invention has been described and illustrated with reference to a specific embodiment thereof, it will be understood that other embodiments may be resorted to without departing from the invention. Therefore, the form of the invention set out above, should be considered as illustrative and not as limiting the scope of the following claims.

What I claim and desire to secure by Letters Patent is:

1. An animal trap comprising a housing having side walls with a plurality of openings therein for the entry of animals, gripping jaws mounted within the housing in alignment with each opening, said gripping jaws having extensions thereon, spring means for actuating said gripping jaws, latching means, releasing means adapted to coact with said latching means to provide automatic setting mechanisms, and push button means extending from said housing adapted to engage with said extensions of said gripping jaws to move the jaws into the set position of the trap.

2. An animal trap comprising a housing having side walls with a plurality of openings therein for the entry of animals, a gripping jaw mounted within the housing at each opening, said gripping jaws having extensions thereon, trap setting means extending through said housing to operatively engage said extensions and move said gripping jaws into set position, spring actuating means for said gripping jaws, latching means including pivoted arms normally urged toward the trip position, and releasing means normally urged toward the set position, said gripping jaws being adapted to engage with said latching means to cause said latching means to by-pass said releasing means and become latched thereby.

3. An animal trap comprising a housing having side walls with a plurality of openings therein for the entry of animals, animal gripping means associated with each of said openings, spring means for urging said gripping means from set to sprung position, latching means for releasably holding said gripping means in set position, setting means acting simultaneously on all of said gripping means to move them from sprung to set position, and animal actuated means for individually releasing said gripping means.

4. An animal trap comprising a housing, a pivoted spring actuated jaw within the housing, a releasing trigger pivoted within the housing and constructed normally to assume a set position under the urge of gravity, a latch pivoted within the housing and resiliently urged to assume a tripped position, said latch having a notched end adapted to receive said jaw and said latch having a trigger engaging arm, said latch being movable by said jaw when the trap is set to tilt said trigger and to be releasably retained thereby, and means extending into said housing to move said jaw into the set position.

5. An animal trap comprising a housing having a flat bottom surface and having an opening in the side wall thereof, a pivotally mounted jaw in said housing above said opening, a spring for said jaw adapted to actuate said jaw downwardly past said opening and against said bottom of the housing, setting means including latch means for said jaw, releasing means for said latch means, and trap setting means extending within said housing to actuate said jaw into the set position.

6. The combination with an animal trap having a plurality of tripping units each including a gripping jaw, latching means for said gripping jaw and trigged releasing means for said latching means to release each of said jaws independently, of setting means for the trap comprising a lever for each unit adapted to move said gripping jaw into the set position, and a single setting member for actuating all of said levers to set all of said units simultaneously.

7. The combination with an animal trap having a plurality of gripping units each including a gripping jaw, latching means for said gripping jaw and trigger releasing means for said latching means, of setting means for the trap, comprising an extension on said gripping jaw, and actuating means for said extension to move said gripping jaw into the set position.

8. The combination with an animal trap having a plurality of gripping units each including a gripping jaw, latching means for said gripping jaw, and trigger releasing means for said latching means, of setting means for the trap comprising an extension on said gripping jaw and push button means adapted to engage with said extension to move said jaw into the set position.

JOHN U. LEHN.

REFERENCES CITED

The following references are of record in the file of this patent:

UNITED STATES PATENTS

| Number | Name | Date |
|---|---|---|
| 1,349,177 | Wiemer | Aug. 10, 1920 |
| 1,967,179 | Schocke | July 17, 1934 |
| 2,059,937 | Ellis | Nov. 3, 1936 |
| 2,157,222 | Stilson et al. | May 9, 1939 |
| 2,233,628 | Meik et al. | Mar. 4, 1941 |